(12) United States Patent
Zhang et al.

(10) Patent No.: US 10,346,145 B2
(45) Date of Patent: Jul. 9, 2019

(54) LOOP EXECUTION WITH PREDICATE COMPUTING FOR DATAFLOW MACHINES

(71) Applicant: INTEL CORPORATION, Santa Clara, CA (US)

(72) Inventors: Yongzhi Zhang, Wayland, MA (US); Kent D. Glossop, Merrimack, NH (US)

(73) Assignee: Intel Corporation, Santa Clara, CA (US)

( * ) Notice: Subject to any disclaimer, the term of this patent is extended or adjusted under 35 U.S.C. 154(b) by 38 days.

(21) Appl. No.: 15/632,123

(22) Filed: Jun. 23, 2017

(65) Prior Publication Data

US 2018/0373509 A1     Dec. 27, 2018

(51) Int. Cl.
| | |
|---|---|
| *G06F 17/50* | (2006.01) |
| *G06F 9/44* | (2018.01) |
| *G06F 17/30* | (2006.01) |
| *G06F 8/41* | (2018.01) |
| *G06F 9/32* | (2018.01) |
| *G06F 8/30* | (2018.01) |

(52) U.S. Cl.
CPC ............... *G06F 8/443* (2013.01); *G06F 8/37* (2013.01); *G06F 8/427* (2013.01); *G06F 8/452* (2013.01); *G06F 9/325* (2013.01)

(58) Field of Classification Search
CPC .......... G06F 8/443; G06F 8/433; G06F 8/456; G06F 8/458; G06F 17/5045; G06F 17/30424; G06F 11/3504
See application file for complete search history.

(56) References Cited

U.S. PATENT DOCUMENTS

| | | | | |
|---|---|---|---|---|
| 6,507,947 | B1* | 1/2003 | Schreiber | G06F 8/452 717/159 |
| 7,000,213 | B2* | 2/2006 | Banerjee | G06F 8/4434 716/103 |
| 7,299,458 | B2* | 11/2007 | Hammes | G06F 8/447 716/103 |

(Continued)

OTHER PUBLICATIONS

Han et al. Compiling control-intensive loops for CGRAs with state-based full predication, 4 pages (Year: 2013).*

(Continued)

*Primary Examiner* — Thuy Dao
(74) *Attorney, Agent, or Firm* — Schwabe, Williamson & Wyatt, P.C.

(57) ABSTRACT

Compilers for compiling computer programs and apparatuses including compilers are disclosed herein. A compiler may include one or more analyzers to parse and analyze source instructions of a computer program including identification of nested loops of the computer program. The compiler may also include a code generator coupled to the one or more analyzers to generate and output executable code for the computer program that executes on a data flow machine, including a data flow graph, based at least in part on results of the analysis. In embodiments, the executable code may include executable code that recursively computes predicates of identified nested loops for use to generate control signal for the data flow graph to allow execution of each loop to start when the loop's predicate is available, independent of whether any other loop is in execution or not. Other embodiments may be disclosed or claimed.

24 Claims, 8 Drawing Sheets

(56) References Cited

U.S. PATENT DOCUMENTS

| | | | |
|---|---|---|---|
| 9,454,571 B2 * | 9/2016 | Grosse | G06F 16/24532 |
| 2004/0194077 A1 * | 9/2004 | Bharadwaj | G06F 11/3612 |
| | | | 717/158 |
| 2006/0041872 A1 * | 2/2006 | Poznanovic | G06F 8/447 |
| | | | 717/140 |
| 2006/0174237 A1 * | 8/2006 | Granston | G06F 8/4452 |
| | | | 717/161 |
| 2014/0052713 A1 * | 2/2014 | Schauer | G06F 17/30412 |
| | | | 707/722 |
| 2017/0344646 A1 * | 11/2017 | Antonopoulos | G06F 17/30867 |
| 2018/0101387 A1 * | 4/2018 | Etsion | G06F 9/448 |
| 2018/0144067 A1 * | 5/2018 | Chatelain | G06F 7/02 |
| 2018/0373509 A1 * | 12/2018 | Zhang | G06F 8/443 |

OTHER PUBLICATIONS

Ming et al., LOOP: Logic-Oriented Opaque Predicate Detection in Obfuscated Binary Code, 12 pages (Year: 2015).*

* cited by examiner

LOOP EXECUTION WITH PREDICATE COMPUTING FOR DATAFLOW MACHINES

STATEMENT OF UNITED STATES GOVERNMENT SUPPORT

This invention was made with Government support under contract number H98230B-13-D-0124-0132 awarded by the Department of Defense. The Government has certain rights in this invention.

TECHNICAL FIELD

Embodiments of the present disclosure relate to the field of computer, and in particular to apparatuses, methods and storage medium associated with program loop execution with predicate computing for dataflow machines.

BACKGROUND

Dataflow machine is a computer in which the primitive operations are triggered by the availability of inputs or operands. It is different from classical von Neumann machines, where there is the concept of sequential flow of control, and an operation (i.e. instruction) is performed when flow of control reaches that operation. Today dataflow machines may not be fully leveraged, in particular, with respect to execution of nested program loops.

BRIEF DESCRIPTION OF THE DRAWINGS

Embodiments will be readily understood by the following detailed description in conjunction with the accompanying drawings. To facilitate this description, reference numerals designate like structural elements. Embodiments are illustrated by way of example, and not by way of limitation, in the figures of the accompanying drawings.

DETAILED DESCRIPTION

Figure 1:
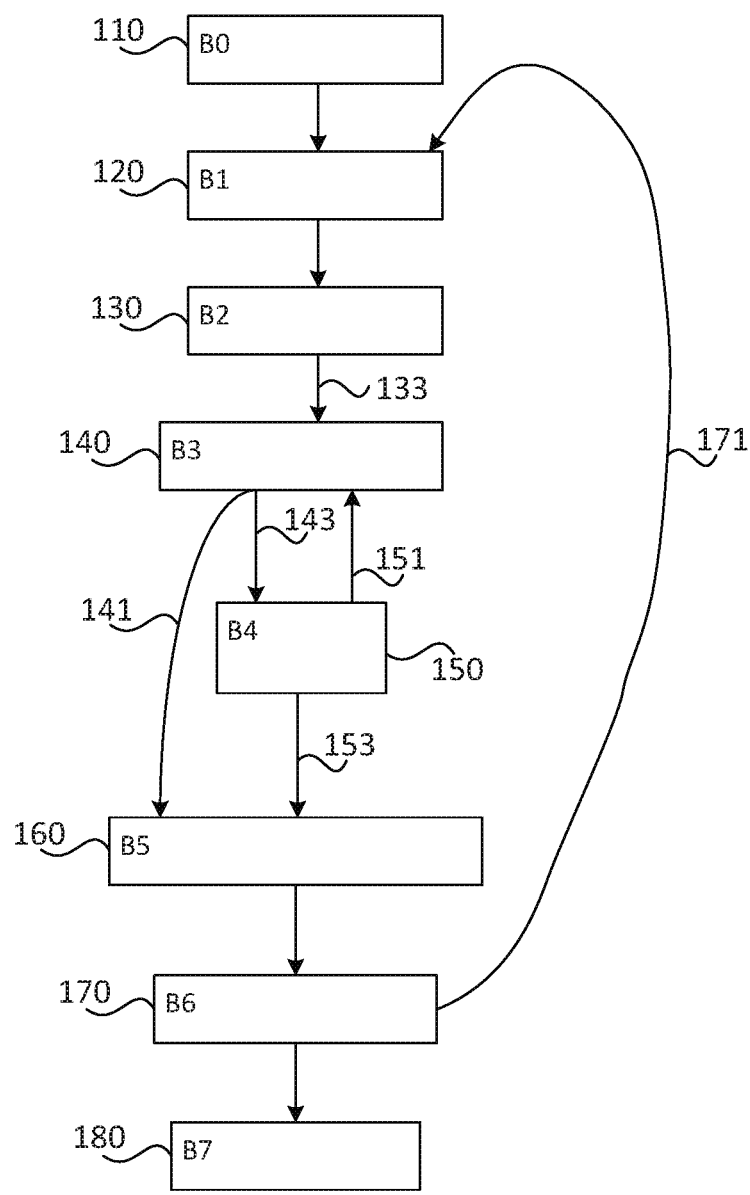
FIG. 1 shows an execution control flow graph of an example program, an inner loop with multiple exits, to illustrate the employment of predicate computation to increase pipelining or parallel execution of nested loops on dataflow machines, according to various embodiments.

In embodiments, predicates may be used to generate control signals for a data flow graph associated with a program for execution of the program on a dataflow machine. In embodiments, generation of the control signals for the dataflow graph of a program may allow most nested loops of the program to be pipelined or executed in parallel.

In embodiments, a compiler may include one or more analyzers to parse and analyze source instructions of a computer program including identification of nested loops of the computer program. In embodiments, the compiler may also comprise a code generator coupled to the one or more analyzers to generate and output executable code for the computer program that executes on a data flow machine, including a data flow graph, based at least in part on results of the analysis. In embodiments, the executable code may include executable code that recursively computes predicates of identified nested loops for use to generate control signal for the data flow graph to allow execution of each loop to start when the loop's predicate is available, independent of whether any other loop is in execution or not.

In the description to follow, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Operations of various methods may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiments. Various additional operations may be performed and/or described operations may be omitted, split or combined in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

Also, it is noted that embodiments may be described as a process depicted as a flowchart, a flow diagram, a dataflow diagram, a structure diagram, or a block diagram. Although a flowchart may describe the operations as a sequential process, many of the operations may be performed in parallel, concurrently, or simultaneously. In addition, the order of the operations may be re-arranged. A process may be terminated when its operations are completed, but may also have additional steps not included in the figure(s). A process may correspond to a method, a function, a procedure, a subroutine, a subprogram, and the like. When a process corresponds to a function, its termination may correspond to a return of the function to the calling function and/or the main function. Furthermore, a process may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium. A code segment may represent a procedure, a function, a subprogram, a program, a routine, a subroutine, a module, program code, a software package, a class, or any combination of instructions, data structures, program statements, and the like.

As used hereinafter, including the claims, the term "circuitry" may refer to, be part of, or include an Application Specific Integrated Circuit (ASIC), an electronic circuit, a processor (shared, dedicated, or group, including one or more "processing elements (PEs) of a data flow machine), and/or memory (shared, dedicated, or group) that execute one or more software or firmware programs, a programmable combinational logic circuit (e.g. Field Programmable Gate Arrays (FPGA)), and/or other suitable hardware components that provide the described functionality. In some embodiments, the circuitry may implement, or functions associated with the circuitry may be implemented by, one or more software or firmware modules.

As used hereinafter, including the claims, the term "memory" may represent one or more hardware devices for storing data, including random access memory (RAM), magnetic RAM, core memory, read only memory (ROM), magnetic disk storage mediums, optical storage mediums, flash memory devices and/or other machine readable mediums for storing data. The term "computer-readable medium" may include, but is not limited to, memory, portable or fixed storage devices, optical storage devices, wireless channels, and various other mediums capable of storing, containing or carrying instruction(s) and/or data.

In embodiments, as will be described in more detail below, predicates may be recursively evaluated across nested loops using a loop initial condition and branch conditions. In embodiments, a cyclically evaluated predicate may be used as a control signal to choose corresponding iterations to be run on a data flow machine. It is noted that in a dataflow engine, such as, for example, the Intel Configurable Spatial Accelerator (CSA), each iteration can fire up once its corresponding predicate is available, maximizing parallelism/pipelining between iterations. Thus, in embodiments, many iterations may be run at the same time, as long as their predicates are available, allowing for the leveraging of hardware and computing resources offered by a data flow machine.

Data flow architecture has been implemented in specialized hardware such as in hardware accelerators, digital signal processing, network routing, graphics processing, telemetry, and more recently in data warehousing. It is also very relevant in many software architectures today including database engine designs and parallel computing frameworks.

It is noted that in a software application, the program source is transformed into a list of instructions for a particular processor, which is then loaded into a memory attached to the processor. Data and instructions are read from memory into the processor core, where operations are performed and the results then written back to memory. Modern processors contain many levels of caching, forwarding and prediction logic to improve the efficiency of this paradigm; however the model is inherently sequential with performance limited by the latency of data movement in this loop.

However, in a dataflow application, the program source may be transformed into a dataflow engine configuration file, which may describe the operations, layout and connections of a dataflow engine. Data may be streamed from memory into a chip where operations are performed, and data may be forwarded directly from one computational unit ("dataflow core") to another, as the results are needed, without being written to the off-chip memory until the chain of processing is complete.

In computer science, predication is an architectural feature that provides an alternative to conditional branch instructions. Predication works by executing instructions from both paths of the branch and only permitting those instructions from the taken path to modify architectural state. The instructions from the taken path are permitted to modify an architectural state because they have been associated (predicated) with a predicate, a Boolean value used by the instruction to control whether the instruction is allowed to modify the architectural state or not.

With predication, all possible branch paths are coded inline, but some instructions execute while others do not. The basic idea is that each instruction is associated with a predicate and that the instruction will only be executed if the predicate is true.

As noted above, conventionally the use of predicates has been for control flow edges and branch optimizations. Various embodiments go beyond that, and compute predicates for iterations of different nested loops. In embodiments, this may be crucial to improve loop performance for data flow machines, such as the Intel CSA. In embodiments, many iterations may be run at the same time, as long as their predicates are available, effectively taking advantage of the large hardware resource of data flow machines, such as the CSA.

For non-dataflow architectures, loop analysis was often used to improve the loop performance, including Induction Variable Analysis. Because the traditional von Neumann architecture uses a PC (program counter) to order a program's execution, there was no need to compute a looping backedge's predicate. However, in a dataflow architecture, there is no PC, and each iteration of a loop can fire up as soon as its inputs are available. Thus, the evaluation of looping backedge's predicates enables concurrent/pipelining the execution of iterations.

In embodiments, a compiler for compiling a computer program, may be used to parse and analyze source instructions of a computer program including identification of nested loops of the computer program, and may be further used to generate and output executable code for the computer program that executes on a data flow machine, including a data flow graph. In embodiments, the generated executable code may include executable code that recursively computes predicates of identified nested loops for use to generate control signal for the data flow graph to allow execution of each loop to start when the loop's predicate is available, independent of whether any other loop is in execution or not.

It is here noted that a compiler is a program that reads a source code (in a source language) and translates it into a target code (in a machine language). The compiler, while formulating the target code, forms an intermediate code (in a machine-independent form). For example, a compiler for FORTRAN translates a high-level source code in the FORTRAN programming language into a target code in machine language, which can be executed by a computer processor. In addition, the compiler for FORTRAN, while forming the target code, forms an intermediate code. Machine-independent optimizations may be performed on the intermediate code.

The techniques of various embodiments are generally applicable to any kind of loops, including loops with multiple exits and/or multiple backedges.

FIG. 1 shows an execution control flow graph of an example program to illustrate the employment of predicate computation to increase pipelining or parallel execution of nested loops on dataflow machines. For the purposes of describing such graphs, the following nomenclature shall be used. An execution control flow graph (CFG) depicts the execution control flow of various blocks of executable code. Some blocks may have multiple exit paths, and others have only one exit path, to the next block. Each block has a predicate, which depends upon a prior or a subsequent block. There may also be edge predicates, which may be the predicates for processing flow moving from one block to the next along that edge, as well as conditional predicates, which express a branch condition from a given block. Thus, for two sequential blocks Bm and Bn in a CFG, Pmn refers to the predicate for a control flow edge BmBn, Pi refers to the predicate for basic block Bi, and Ci refers to a branch condition for Bi.

FIG. 1 thus illustrates a CFG 100 of the example program having code blocks B0 110 through B7 180. As may readily be seen, the example program have two nested loops. An inner loop including blocks B3 140 and B4 150, and an outer loop including blocks B1 120, B2 130, B3 140, B4 150, B5 160 and B6 170. P61 171 is thus the backedge predicate for the outer loop, which, when true, causes execution to return to block B1 120 following completion of execution at block B6. Similarly, for inner loop B3 140 and B4 150, P43 151 is the backedge predicate which, when true, causes execution flow to return to block B3 140 following completion of execution at block B4 150.

Continuing with references to FIG. 1, for the inner loop containing only blocks B3 and B4, predicate P23 133 (the predicate for edge B2→B3) may be referred to as the inner loop's initial predicate, and P43 151 (the predicate for edge B4→B3) may be referred to as the inner loop's backedge predicate. In embodiments, the predicate of each control flow edge for each iteration may be first computed. In embodiments, this may be done recursively.

In general, if, for example, the predicate for a loop header is Ph, each control flow edge's predicate Pmn may be a function of Ph, or Pmn=f(Ph). Ph itself may be determined by its two incoming edges, Pinitial, and Pbackedge, by Ph=Pbackedge∥Pinitial. In embodiments, the ∥ operator may be a short-circuit operation in that if the first operand is evaluated to be true, the second operand will not be evaluated. In general, it may be called "lor", i.e., a logical-or operator. Thus, for example, in the statement Ph=Pbackedge∥Pinitial, first Pbackedge is evaluated, and if true, Ph is set to 1, and Pinitial is not evaluated. Thus, because Pbackedge=f(Ph), $$Ph = Pbackedge \| Pinitial$$
$$= f(Ph) \: lor \: Pinitital,$$

is a recursive function.

In embodiments, the order of evaluation may be maintained in this recursive function. In embodiments, the order given may ensure that a loop initial predicate is only evaluated when the backedge predicate is false. In embodiments, this property may guarantee that the loop initial predicate is evaluated once for all the iterations of the loop. In embodiments, this property allows a dataflow machine to avoid the creation of copies of data. Only when Pinitial is true, the whole cyclic predicate computation starts, thereby avoiding applying it to loops that are not executed. For example, with reference to the inner loop of FIG. 1, the loop's initial predicate is P23 133. Thus, execution of the loop B3-B4 will proceed if execution flow first reaches block B3, which means that execution flow moves from B2 130, along control edge B23 133 to block B3, which means that P23 have been evaluates as true. Given that this is the case, once execution flow reaches block B3 140, there is a branch condition C3 from there: execution flow may either proceed to block B4 150 along edge 143, or it may proceed along edge 141 to block B5 160. The loop B3-B4 will only iterate if both P4 is true and P43 (the backedge predicate of the loop) is also true.

In embodiments, the recursion may be expanded from an inner loop to the closest outer loop in that the outer loop's backedge predicate is a function of the predicate computed in the inner loop. Similarly, a given inner loop's predicate is a function of the incoming edges from the outer loop. In embodiments, processing may follow the recursive function, starting from inner loops and expanding to outer loops.

For example, continuing with references to FIG. 1, given the CFG 100 shown therein, the following relationships control:

P3=P43∥P23, where ∥ is the short circuit logical OR
P34=P3 && C3, where && is a logical AND function
P4=P34
P43=P4 && C4

P3, the predicate for block B3 140, is as described above, a function of the loop header and the loop backedge. P34 is true if both P3, the predicate of block B3, and C3, the branch condition (true=stay in the loop) at block B3 140 are true. If so, then execution flow may take edge P34, and move to block B4 150. Because block B4 has only one incoming edge, B3B4, if this edge is taken then block B4 is executed, so P4 depends on this edge predicate being true. Finally, P43, the backedge path, which iterates the loop, is true if both P4 is true, i.e., block B4 is executed, and branch condition C4, which determines whether block B4 returns to block B3, are true.

In embodiments, once P23, the only input from outside the loop, is true, the cyclic predicate computation may begin.

In embodiments, the predicate for each loop iteration, Piter, may be derived from the cyclic computation described above. Specifically, it may be derived from the loop's backedge predicate, P43 in the example of FIG. 1. In embodiments, to obtain the iteration predicate Piter from P43, the zero value may first be filtered out. This implements the property that whenever Piter is true, iteration i can fire. For example, in embodiments executing on the Intel CSA, the filtering may be done in one basic data flow instruction, SWITCH, as follows:

% ign, % Pt1=SWITCH P43, 1

Based on the value of P43 (0 or 1), the SWITCH instruction assigns 1 to either % Pt1, if P43 is 1, or to % ign if P43 is 0, which means to ignore it. Thus, in this example, Pt1 is the value of P43 with its 0 value filtered out. It is noted that more generally, SWITCH is a fan-out assignment instruction that assigns the value of its operand, here 1, to one of two variables based on the value of its predicate input, here P43. Thus, one of the variables % Pt1 and % ign are assigned the 1 operand based on the value of predicate input P43.

Moreover, in embodiments, Piter may be set to have initial value 0, representing the fact that the cyclic evaluation of predicates is triggered only by the loop initial predicate P23, as described above. Thus, for example, the following assignment may be made:

initial Piter 0

In embodiments, once the loop exits, Piter may be reset to its initial value. In embodiments, the exit edge predicates of all exit edges, may be combined, and use to reset Piter to 0. As can be seen, the exiting edges of loop B3B4 are edge B3B5, and edge B4B5.

In embodiments, this may be performed because the predicates of all exit edges have already been evaluated during the cyclic predicate evaluations. Thus, if Pexit is the final computed loop exit predicate, in embodiments, another dataflow instruction used on the CSA, PICK, may be used to obtain the final predicate for loop iterations:

Piter=PICK Pexit Pt1, 0

In this example, the PICK instruction picks a value based on Pexit and assigns it to Piter. When Pexit is true, the loop is exiting, and it picks 0 to reset the Piter to 0. Otherwise PICK picks Pt1 the filtered backedge predicate. More generally, PICK is a fan-in assignment instruction that chooses between its two operands (here Pt1 or 0), based on the value of a stated predicate (here Pexit).

Thus, as may be appreciated, the iteration predicate may be an effective way to pipeline/parallelize iterations on a data flow machines. In embodiments, the code to generate the predicate computation to complement the dataflow graph of a program targeted for execution on a dataflow machine may be implemented in a compiler configured to compile source programs and generate object codes for execution on dataflow machines, e.g., Intel CSA, to be described more fully below.

Thus, in embodiments, the computation of a loop iteration's predicate may determine if the iteration can be run. If the iteration's predicate turns out to be false, then the inputs to the iterations may be shut off using special data flow instructions, and prevent the iteration from running.

The computation of the iteration's predicate is itself data driven. Thus, in embodiments, iterations may proceed in an overlapping/pipeline/parallel manner, totally dependent upon the data dependence nature of the program.

Figure 2:
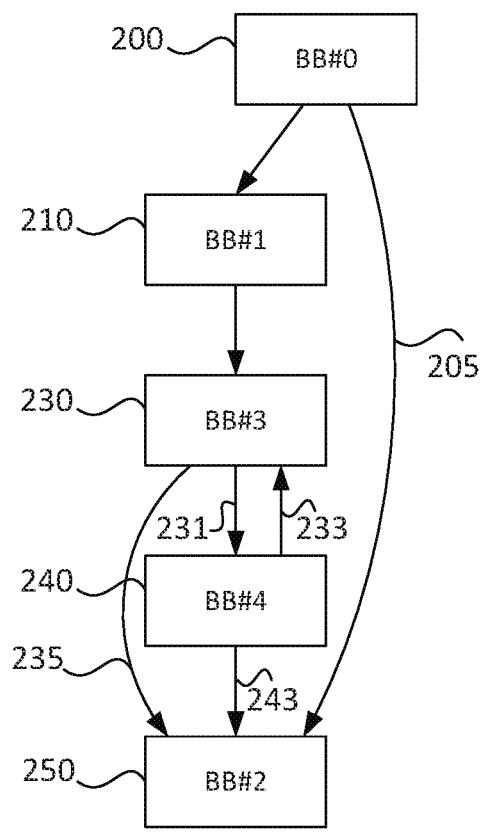
FIG. 2 shows another execution control flow graph, for a dot product calculation function with loop unrolling, to further illustrate the employment of predicate computation to increase pipelining or parallel execution of nested loops on dataflow machines, according to various embodiments.

Referring now to FIG. 2, wherein a CFG of an example dot product calculation function is shown, to illustrate the employment of predicate computation to increase pipelining or parallel execution of nested loops on dataflow machines. In order to make the example more general, a loop unrolled version is shown here—the original loop has only one block which was unrolled into two blocks, B3 and B4. This CFG 200 contains five executable blocks, beginning with block 0 200, block 1 210, block 3 230, block 4 240 and block 2 250. Each block is labeled as BB#0, BB#1, . . . BB#4. Moreover, blocks 3 230 and 4 240 comprise a loop, and at block 3 230, there is a branch condition, where execution flow may skip block 4 240 and proceed along path 235 to block 2 250, or may continue to block 4 240, where it may loop back to block 3 230 along backedge 233, or it may proceed to block 2 250, as shown, along path B43, 243.

The CGF 200 of FIG. 2 is for an example computer program that calculates the dot product of two numbers x and y, the source code of may be as follows:

```
extern "C" {
    double t001_dotprod(int n, double* x, double* y) {
        double result = 0;
        for(int i=0; i<n; ++i) {
            result += x[i]*y[i];
        }
        return result;
    }
}
```

Figure 3:
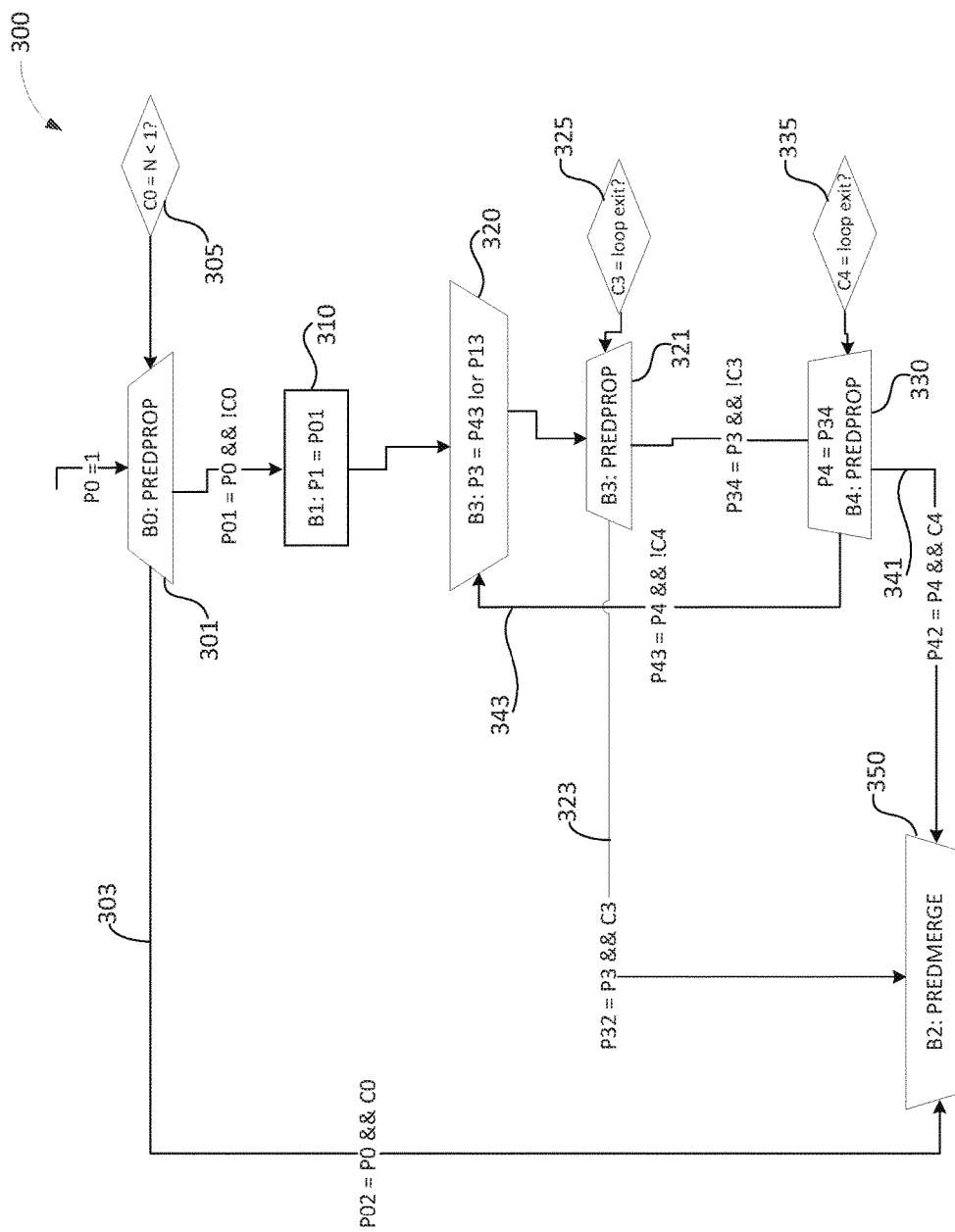
FIG. 3 illustrates a more detailed version of the data flow graph of FIG. 2, indicating predicates for each block and how they are calculated, according to various embodiments.

FIG. 3 is an alternate Data Flow Graph 300 to the one presented in FIG. 2. The Data Flow Graph 300 of FIG. 3 expands on CFG 200 including the calculations of the various predicates for each code block and edge, which are next described. With references to FIG. 3, the predicate P0 to block B0 may first be evaluated. Here it is true, indicated by P0=1, and processing may continue to block B0. At block B0 301, there is a branch condition 305 that tests whether the loop counter integer N is less than 1. If it is, then the dot product function does not operate, as there are no iterations to compute. In that case the program proceeds to block B2 350, where execution stops. The three edges entering block B2 all terminate there, indicated by the example instruction "PREDMERGE", which, for the purposes of the example of FIG. 3, is a predicate merge instruction, analogous to the PICK instruction described above. It is noted that in a general case "PREDMERGE" may be replaced here with "P2=P02||P32||P42."

Continuing with references to FIG. 3, for the case where C0, the branch condition at block B0 is satisfied, the predicate for moving to block B1 310, P01 may be calculated as P0 && NOTC0. I.e., if N is not less than 1, and predicate P0 is true, then the execution may proceed to block B1 310. As there is only one entrance to block B1, P1=P01. I.e., if the program enters block B1, then it executes block B1. A similar state of affairs is true with regards to proceeding to block B3 320. As there is only one entrance to block B3, if P13 is true, and the execution proceeds to block B3 320, then block B3 is executed. Because P3=P43||P13, as long as P13 is true, P3 is true. However, once block B3 is executed, there is a branch condition which determines if execution proceeds to block B4 330, or if from block B3 the execution proceeds to block B2, as shown by path 323. This depends upon loop exit condition C3 shown at 325. Thus, P32, the predicate for proceeding to block B2,=P3 && C3. I.e., if block B3 is executed, and the loop exit condition is also true, then execution exits and ends at block B2 350. For this aspect of block B3 a separate block is shown, namely 321, but it is for illustration only, and both 320 and 321 represent block BB#3 230 in FIG. 2. Exiting at B3 321 to block B2 is shown by the instruction "PREDPROP", which is a predicate propagation instruction, analogous to the SWITCH fan-out instruction described above. In this example, PREDPROP essentially means to compute and propagate predicates to all outgoing edges.

On the other hand, if at block B3 C3 325 is 0, and thus no loop exit, then B3 320 proceeds to block B4 330. Thus, the predicate to move from B3 to B4 which is P34, is as follows: P34=P3 && NOTC3 (shown in FIG. 3 as "!C3"). I.e., if the loop exit condition C3 is false, and the predicate for block B3 is true (which it was or the program would not have executed block B3), then execution proceeds to B4, and executes block B4. This is because P4, the predicate to execution of B4 330 equals the predicate to move to block B4 from block B3, or P4=P34, as shown at 330.

At block B4 there is a final branch condition C4. After executing block B4, the program may either continue on to block B2, or loop back to block B3. This depends upon loop exit condition C4 at 335. If C4 is true, then the predicate P42 is true, because of the relationship P42=P4 && C4, as shown at path 341. If, however, the loop exit condition is false, and C4=0, then execution proceeds back to block B3 for an iteration of the loop. Whether or not the program loops back to block B3 is expressed by predicate P43, which is the loop iteration predicate Piter is derived from. Piter is P43 with 0 value filtered out, where P43=P4 && !C4, as shown at path 343. Like previous example, with SWITCH instruction, we have % ign, Pt=SWITCH P43, 1. Pier is initialized to 0, so when loop exit, Piter need also be reset to 0, as in the previous example, Piter=PICK P32||P42, Pt, 0, meaning when one of the exiting edge is taken (P32||P42 is true), Piter=0, else Piter is Pt which is the backedge predicate with 0 filtered out. Looping back to B3 320 from block B4 is shown by the instruction "PREDPROP" at block B4 330.

Figure 4A:
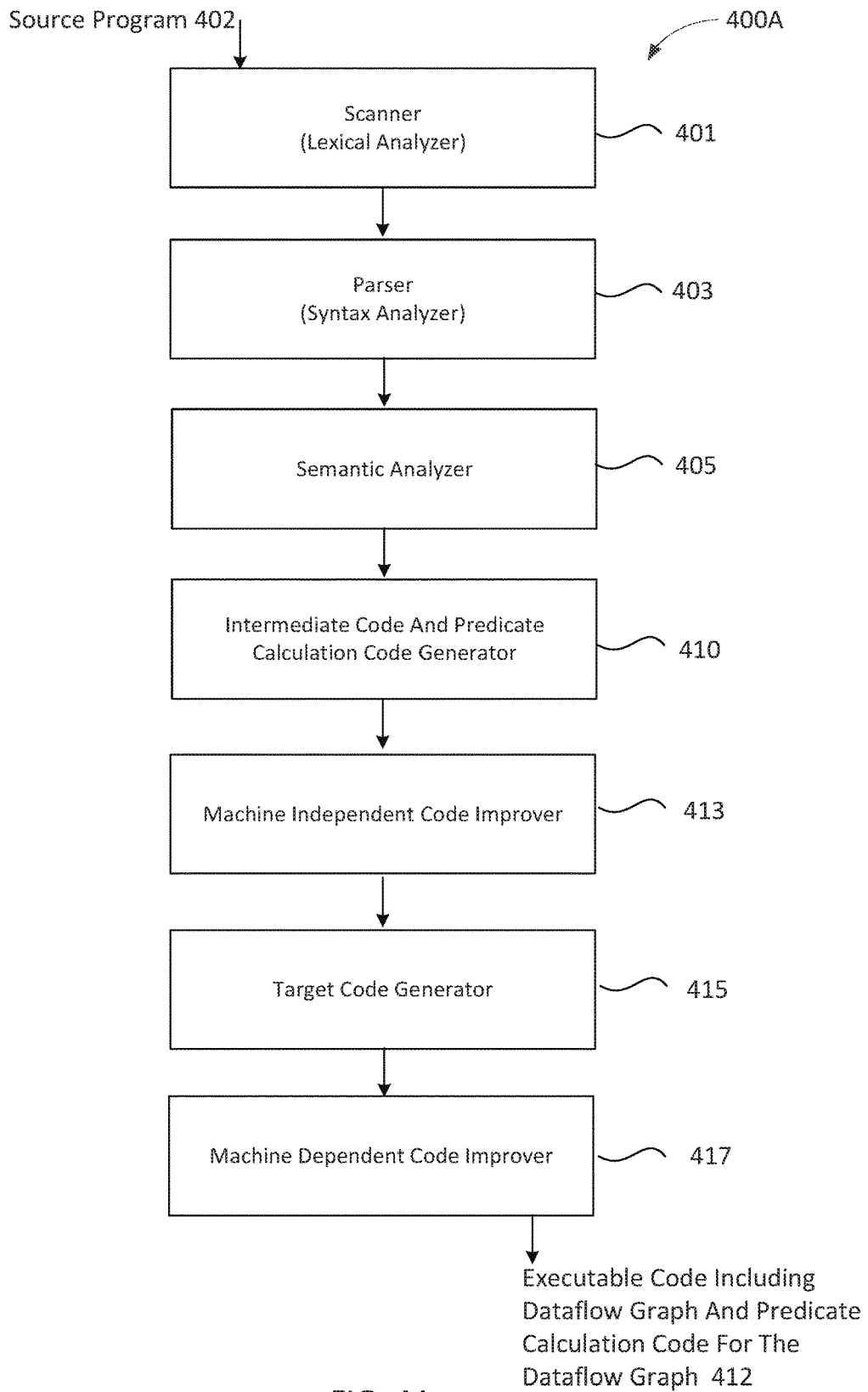
FIG. 4A illustrates an example compiler architecture to compile source code and output a dataflow graph and additional predicate computation code for the dataflow graph, in accordance with various embodiments.

Referring now to FIG. 4A, an example compiler architecture 400A incorporated with the teachings of the present disclosure is shown. With reference to FIG. 4A, at the top of the architecture, Source Code 402 may be input to the compiler. The compiler architecture may comprise seven blocks, representing the various phases of the compiler. It is noted that blocks 401 through 405 perform an analysis function, and blocks 410 through 417 perform a code generation, or synthesis, function. In embodiments, compiler architecture 400A may be used to identify nested loops and data dependencies as part of its analysis function, and may, as part of its code generation function, be used to generate additional code to complement a dataflow graph, the additional code to, when executed, compute the predicates that may be used to generate control signals for the dataflow graph, as described herein, according to various embodiments, to improve pipelining and parallel execution of the nested loops.

Source code 402 may enter the compiler, as shown on top of FIG. 4A, and Executable Code 412 suitable for execution on a dataflow machine with recursive predicate calculations for nested loops of Source code 402 may be produced, as shown at the bottom of the figure.

Beginning with reference to compiler block 401, there may be a Scanner, or Lexical Analyzer, which may convert a source program's 402 stream of characters into a stream of tokens, and remove whitespace, remove comments, expand macros and so forth. The resulting token stream may be passed to a Parser, or Syntax Analyzer 403, that may turn the token sequence into e.g., an abstract syntax tree. The abstract syntax tree generated by Parser 403 may be passed to Semantic Analyzer 405, which may check legality rules, and, while doing so, may also tie up the pieces of the syntax tree (by resolving identifier references, inserting cast operations for implicit coercions, etc.) to form a semantic graph. In embodiments, Semantic Analyzer 405 may identify nested loops and data dependencies of Source Program 402, and include the information in the semantic graph.

Continuing with reference to FIG. 4A, the semantic graph generated by Semantic Analyzer 405 may be passed to Intermediate Code And Predicate Calculation Code Generator 410. Intermediate Code And Predicate Calculation Code Generator 410 may generate intermediate code (pre-optimization) for Source Program 402 in accordance with the semantic graph. In embodiments, Intermediate Code And Predicate Calculation Code Generator 410 may also produce a dataflow graph made up of tuples grouped into basic blocks, and code for recursively calculate predicates for nested loops (as earlier described) to complement the dataflow graph (to generate control signals for the dataflow graph during execution on a dataflow machine. The intermediate code (including the code for recursive calculation of the predicates of nested loops) along with the dataflow graph may be passed to Machine Independent Code Improver 413. Machine Independent Code Improver 413 may optimize the intermediate code in various ways, and pass the optimized code along with the dataflow graph to Target Code Generator 415.

Target Code Generator 415 may string basic blocks together into straight line code with fall-through, and pass assembly language code to a final stage, Machine Dependent Code Improver 417, which may perform additional optimizations and cleanup, and produce Executable Code 412. As shown at 412 in FIG. 4A, compiler 400A outputs a dataflow graph for the computer program, and also outputs the additional code generated to compute the predicates that may be used to generate the control signals for the dataflow graph.

Besides incorporating these teachings, compiler 400A may be any compiler known in the art, capable of compiling source code in a high level language, e.g. C, C++, Fortran, etc., and outputting machine executable code. While for ease of understanding compiler 400A has been described as having seven phases. In alternate embodiments, some of the phases may be combined or split. Similarly, in alternate embodiments, the identification of nested loops and data dependencies, and generation of the code to recursively compute the predicates for the nested loops may be implemented in other phases or supplemental functions of the compiler beside Semantic Analyzer 405 and/or Intermediate Code And Predicate Calculation Code Generator 410.

Figure 4B:
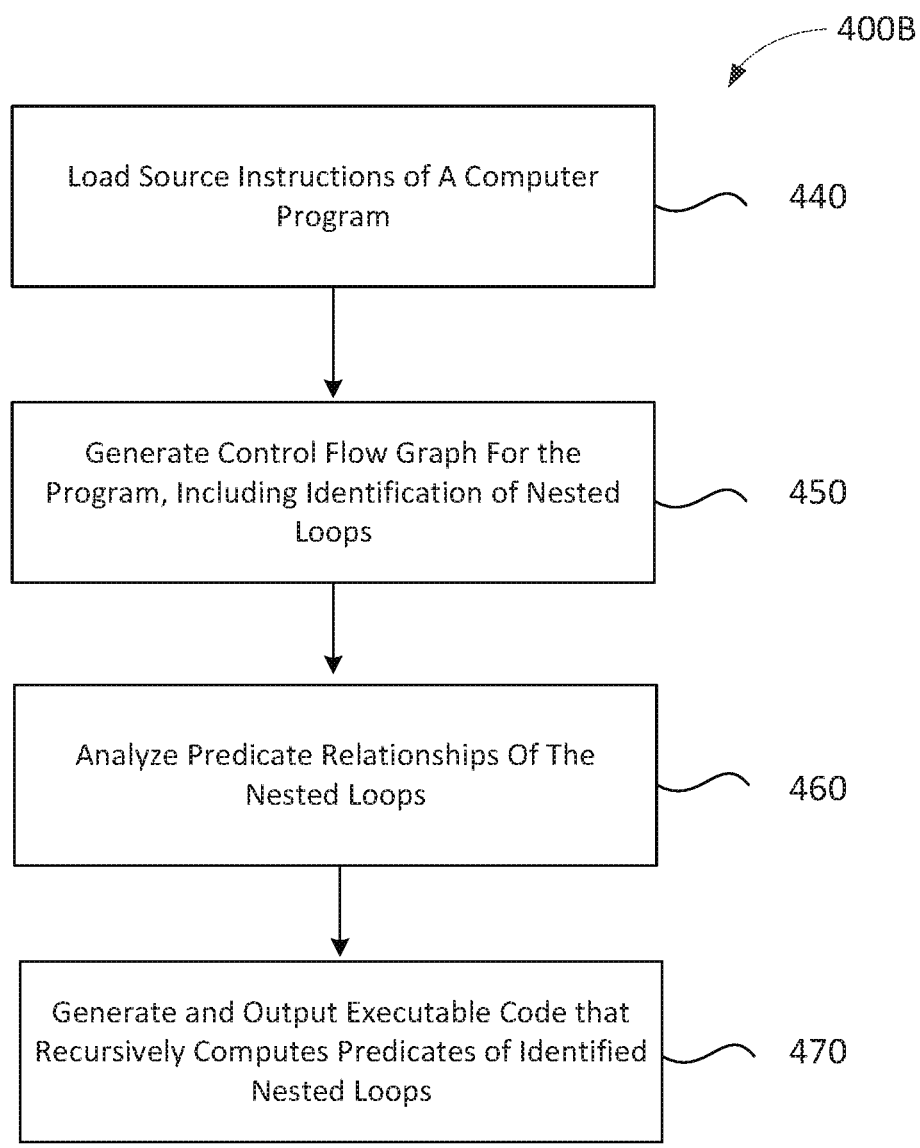
FIG. 4B illustrates an overview of the operational flow of a process for loading a computer program and generating executable code to recursively compute predicates of nested loops, in accordance with various embodiments.

FIG. 4B illustrates an overview of operational flow for a process for a compiler, e.g., a compiler having an architecture as depicted in FIG. 4A, operating on source code and generating corresponding object code that includes executable code to recursively compute predicates of nested loops of the program, in accordance with various embodiments. As illustrated, processes 400B may include operations performed at blocks 440-470. With reference to FIG. 4B, process 400B may begin at block 440. At block 440 a compiler may load source instructions of a computer program for analysis, e.g., Source Program 402 of FIG. 4A. From block 440 process 400B may proceed to block 450, where the compiler may generate a control flow graph for the computer program, and may identify one or more nested loops and data dependencies of the computer program. In doing so the compiler may generate a control flow diagram such as is illustrated in FIGS. 1-3, described above. From block 450, process flow may proceed to block 460, where the predicate relationships of the nested loops identified at block 450 may be analyzed. From block 460 process 400B may proceed to block 470, where the compiler may generate and output executable computer code that, when executed, effectuate functions of the computer program with implementations of recursive computation of predicates for the identified nested loops to improve pipelining and parallel execution of the nested loops on a dataflow machine. In embodiments, the executable code generated for a computer program by the compiler may include a dataflow graph augmented with executable code to perform predicate calculation to generate control signals for the data flow graph, as earlier described with references to FIGS. 1-3, and as described below with reference to FIG. 5. In embodiments, the executable code may be output to a data flow machine. In embodiments, the computer code may be output to a dataflow machine, e.g., the CSA.

Figure 5:
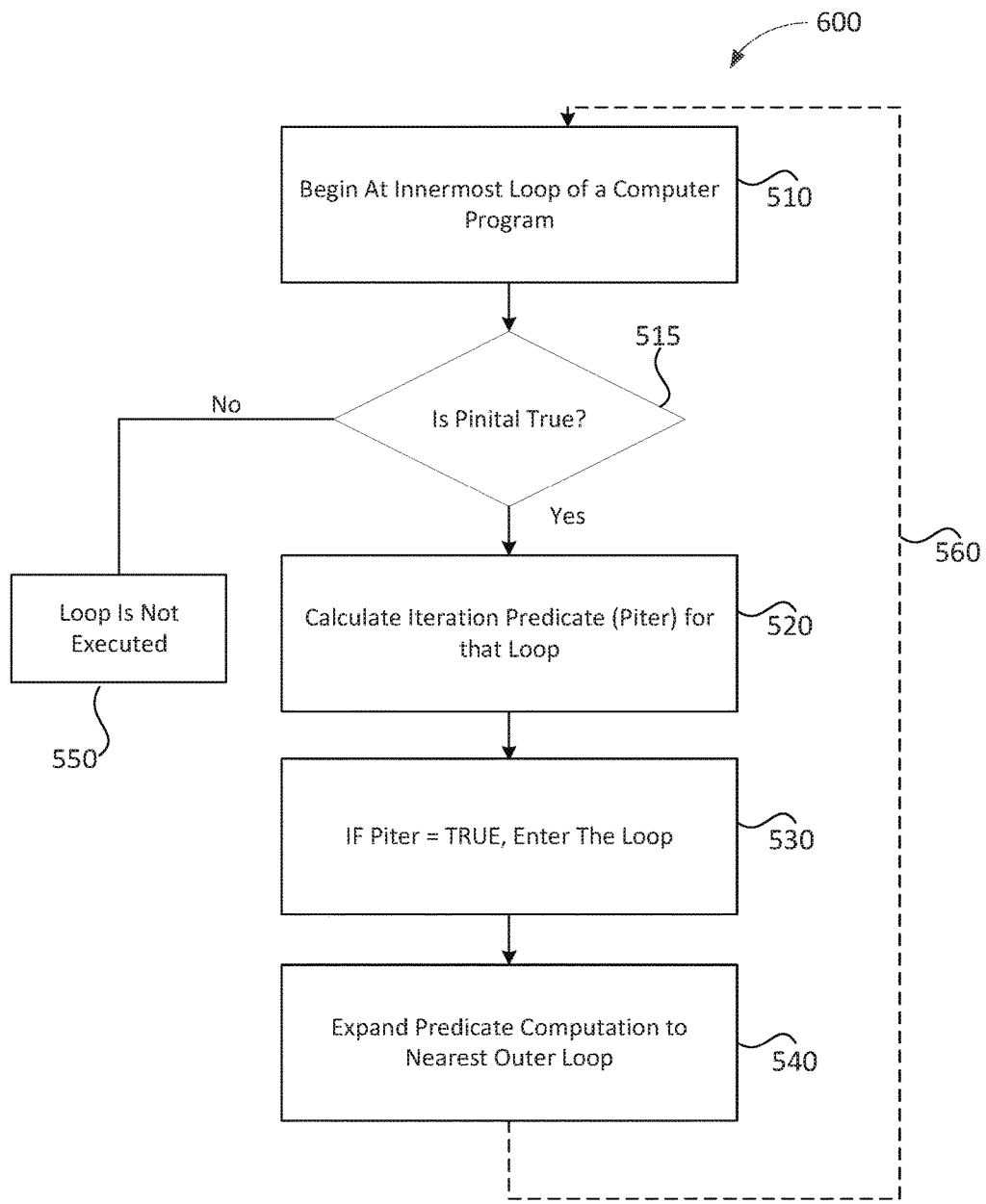
FIG. 5 illustrates an overview of the operational flow of the generated code to recursively compute predicates of nested loops during execution on a dataflow machine, in accordance with various embodiments.

Referring now to FIG. 5, an overview of operational flow for a process for implementing executable code to recursively compute predicates of nested loops and control loop execution, in accordance with various embodiments, is illustrated. The process of FIG. 5 implements the executable code generated by the compiler pursuant to the expanded CFG as shown in FIGS. 4A and 4B. As illustrated, process 500 may include operations performed at blocks 510-550. The operations at blocks 510-550 may be performed e.g., by a data flow machine, which may be Hardware Accelerator 605 of a computing apparatus, executing the object code of a computer program generated by a compiler, along with a dataflow graph and the additional code to perform the complementary predicate calculations.

Process 500 may begin at block 510. At block 510 execution may begin at an innermost loop of a computer program. From block 510 process 500 may proceed to query block 515, where a determination may be made if the initial predicate, Pinitial, for the loop under consideration is true. In the example of FIG. 1, Pinitial is P23, as described above If "No" at query block 515, then the loop is not entered at all, and process 500 may move to block 550, where process flow may terminate. However, if Pinitial is true, i.e., a "Yes" at query block 515, then process 500 may proceed to block 520, where the iteration predicate, Piter, for the loop may be calculated. Again, in the example of FIG. 1, Piter was P43, the backedge predicate of the inner loop B3-B4.

From block 520, process 500 may proceed to block 530, where, if Piter is true, process 500 enters the loop. If Piter is not true, the loop is not entered. It is here noted that this addresses a general case where the outer loop is not dependent upon the processing of the inner loop. E.g., with reference to FIG. 1, once block B4 of the program is executed, it is not necessary to loop through B3 in order to continue execution at block B5. Thus, the backedge predicate 171, i.e., P61, of the outer loop B1-B6 may still be true at block B6. Thus, even though process 500 does not enter the inner loop at block 530, process 500 may still proceed to block 540, where it expands the predicate computation to the next outer loop. Because process 500 here repeats, moving to successive outer loops, there is shown a dotted line returning to block 510, where process would next begin at the next innermost loop, relative to the loop it has just analyzed. If, at block 540 there are no additional loops in the computer program, process 500 may terminate.

Alternatively, in embodiments where entering the outer loop is dependent upon the processing of the inner loop, then at block 530, process 500 would be unable to proceed to block 540, and process flow would move to block 550, where process 500 would end.

Figure 6:
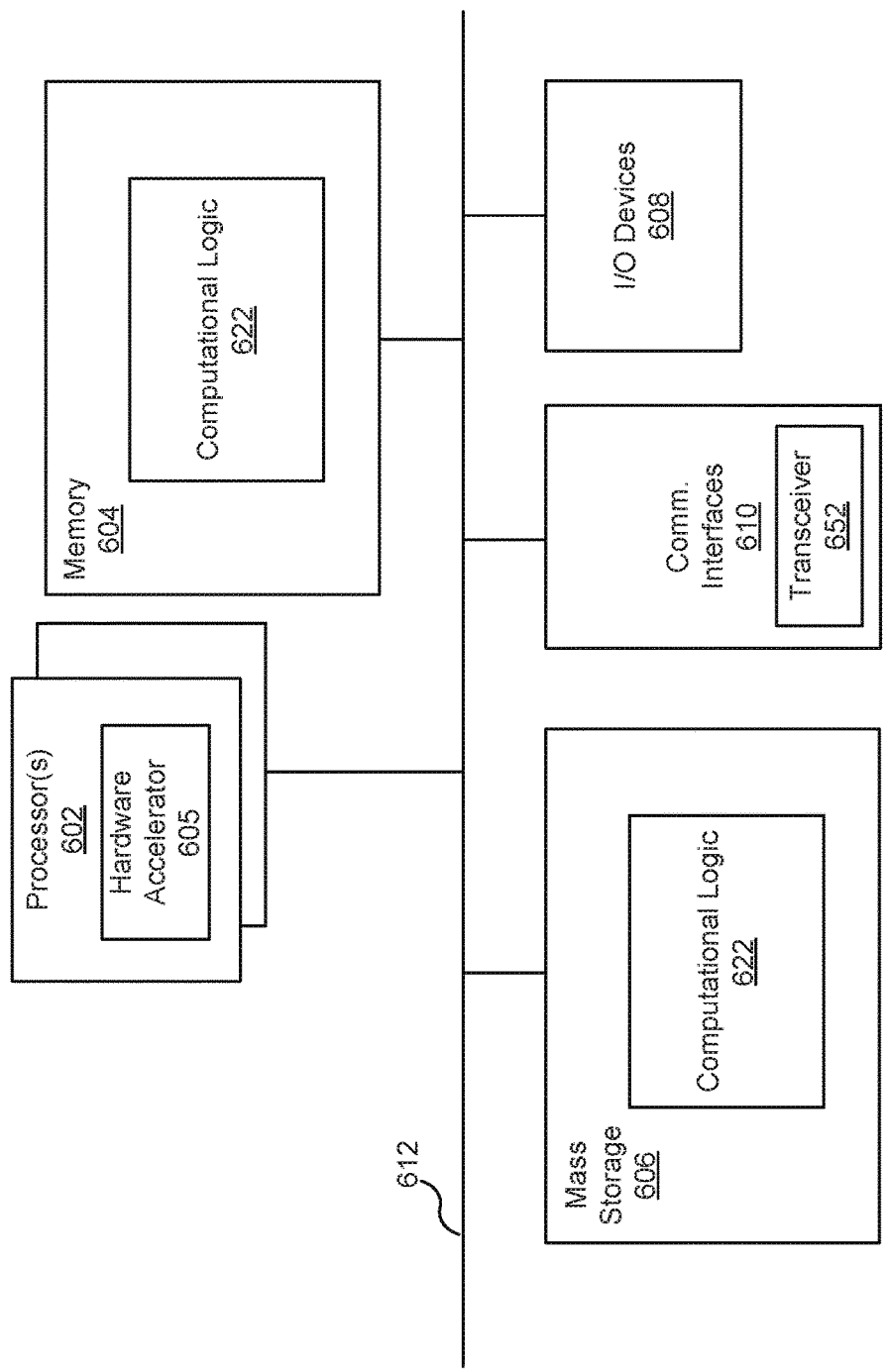
FIG. 6 illustrates a block diagram of a computer device having a dataflow machine (hardware accelerator) suitable for practicing the present disclosure, in accordance with various embodiments.

Referring now to FIG. 6, wherein a block diagram of a computer device suitable for practicing the present disclosure, in accordance with various embodiments, is illustrated. As shown, computer device 600 may include one or more processors 602, memory controller 603, and system memory 604. Each processor 602 may include one or more processor cores, and hardware accelerator 605. An example of hardware accelerator 605 may include, but is not limited to, programmed field programmable gate arrays (FPGA). In embodiments, hardware accelerator may be configured to operate as a dataflow machine. In embodiments, processor 602 may also include a memory controller (not shown). System memory 604 may include any known volatile or non-volatile memory.

Additionally, computer device 600 may include mass storage device(s) 606 (such as solid state drives), input/output device interface 608 (to interface with various input/output devices, such as, mouse, cursor control, display device (including touch sensitive screen), and so forth) and communication interfaces 610 (such as network interface cards, modems and so forth). In embodiments, communication interfaces 610 may support wired or wireless communication, including near field communication. The elements may be coupled to each other via system bus 612, which may represent one or more buses. In the case of multiple buses, they may be bridged by one or more bus bridges (not shown).

Each of these elements may perform its conventional functions known in the art. In particular, system memory 604 and mass storage device(s) 606 may be employed to store a working copy and a permanent copy of the executable code of the programming instructions of an operating system, one or more applications, and various modules, collectively referred to as computing logic 622, which may include a compiler, which may be configured to have the architecture 400A and practice (aspects of) process 400B as described in FIGS. 4A and 4B. In embodiments, the executable code generated for a computer program by the compiler may include a dataflow graph augmented with executable code to perform predicate calculation to generate control signals for the data flow graph, as earlier described with references to FIGS. 1-3 and 5. The programming instructions implementing computing logic 622 may comprise assembler instructions supported by processor(s) 602 or high-level languages, such as, for example, C, that can be compiled into such instructions. In embodiments, some of computing logic may be implemented in hardware accelerator 605.

The permanent copy of the executable code of the programming instructions or the bit streams for configuring hardware accelerator 605 may be placed into permanent mass storage device(s) 606 in the factory, or in the field, through, for example, a distribution medium (not shown), such as a compact disc (CD), or through communication interface 610 (from a distribution server (not shown)). While for ease of understanding, the compiler and the hardware accelerator that executes the generated code that incorporate the predicate computation teaching of the present disclosure to increase the pipelining and/or parallel execution of nested loops are shown as being located on the same computing device, in alternate embodiments, the compiler and the hardware accelerator may be located on different computing devices.

The number, capability and/or capacity of these elements 610-612 may vary, depending on the intended use of example computer device 600, e.g., whether example computer device 600 is a smartphone, tablet, ultrabook, a laptop, a server, a set-top box, a game console, a camera, and so forth. The constitutions of these elements 610-612 are otherwise known, and accordingly will not be further described.

Figure 7:
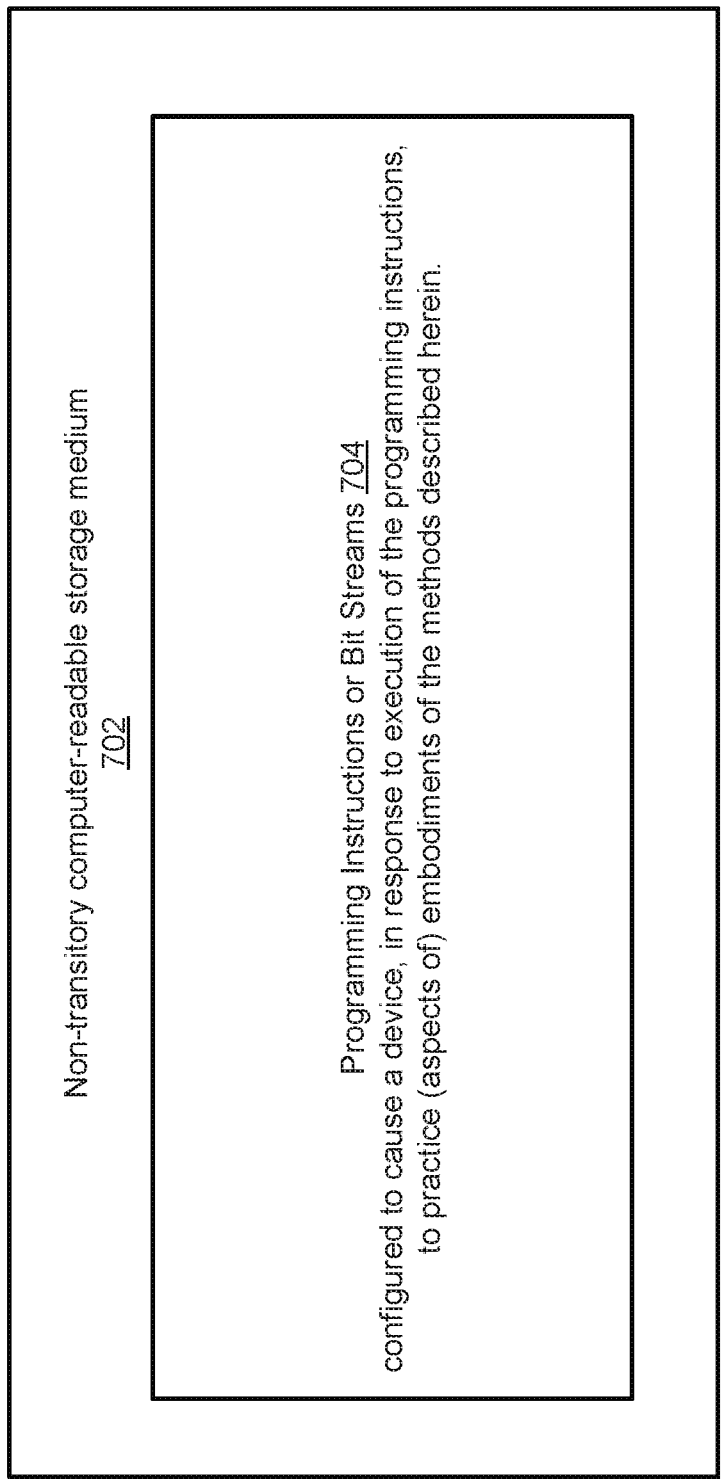
FIG. 7 illustrates an example computer-readable storage medium having instructions configured to practice aspects of the processes of FIGS. 2-5, in accordance with various embodiments.

FIG. 7 illustrates an example computer-readable storage medium having instructions configured to implement and/or practice (aspects of) processes 400A, 400B and 500 of FIGS. 4A, 4B and 5, respectively, earlier described, in accordance with various embodiments. As illustrated, computer-readable storage medium 702 may include the executable code of a number of programming instructions or bit streams 704. Executable code of programming instructions (or bit streams) 704 may be configured to enable a device, e.g., computer device 600 (in particular, hardware accelerator 605), in response to execution of the executable code/programming instructions (or operation of an encoded hardware accelerator 705), to perform (aspects of) processes 400A, 400B and 500 of FIGS. 4A, 4B and 5, respectively. In alternate embodiments, executable code/programming instructions/bit streams 704 may be disposed on multiple non-transitory computer-readable storage medium 702 instead. In embodiments, computer-readable storage medium 702 may be non-transitory. In still other embodiments, executable code/programming instructions 704 may be encoded in transitory computer readable medium, such as signals.

Referring back to FIG. 6, for one embodiment, at least one of processors 602 may be packaged together with a computer-readable storage medium having some or all of the generated code by the compiler of computing logic 622 (in lieu of storing in system memory 604 and/or mass storage device 606) configured to practice all or selected ones of the operations earlier described with reference to FIG. 5. For one embodiment, at least one of processors 602 may be packaged together with a computer-readable storage medium having some or all of the generated code by the compiler of computing logic 622 to form a System in Package (SiP). For one embodiment, at least one of processors 602 may be integrated on the same die with a computer-readable storage medium having some or all of the generated code by the compiler of computing logic 622. For one embodiment, at least one of processors 602 may be packaged together with a computer-readable storage medium having some or all of the generated code by the compiler of computing logic 622 to form a System on Chip (SoC). For at least one embodiment, the SoC may be utilized in, e.g., but not limited to, a hybrid computing tablet/laptop.

The techniques describe above may be applied generally to loops with multiple exits, providing a novel way to pipeline/parallelization the loops. In embodiments, the described techniques may be applied to any kind of loop, and are thus implementation friendly. As noted, the described techniques may be embodied in a compiler and accelerate loops executing on data flow machines.

Illustrative examples of the technologies disclosed herein are provided below. An embodiment of the technologies may include any one or more, and any combination of, the examples described below.

EXAMPLES

Example 1 may include a compiler for compiling a computer program, comprising one or more analyzers to parse and analyze source instructions of a computer program including identification of nested loops of the computer program; and a code generator coupled to the one or more analyzers to generate and output executable code for the computer program that executes on a data flow machine, including a data flow graph, based at least in part on results of the analysis, wherein the executable code includes executable code that recursively computes predicates of identified nested loops for use to generate control signal for the data flow graph to allow execution of each loop to start when the loop's predicate is available, independent of whether any other loop is in execution or not.

Example 2 may include the compiler of example 1, and/or some other examples herein, wherein the computed predicate of an identified loop is a function of the loop's initial predicate (Pinitial) and the predicate of its backedge (Pbackedge).

Example 3 may include the compiler of example 2, and/or some other examples herein, wherein the predicate of the identified loop is computed as: Pbackedge||Pinitial, where || is a logical OR operation.

Example 4 may include the compiler of example 3, and/or some other examples herein, wherein the || operator is a short-circuit operator, wherein Pbackedge is first evaluated, and if Pbackedge is true, Pinitial is not evaluated.

Example 5 may include the compiler of example 2, and/or some other examples herein, where Pinitial is only evaluated once for all of the iterations of the loop.

Example 6 may include the compiler of example 2, and/or some other examples herein, wherein the computed predicate of an identified loop is also a function of branch conditions within the loop.

Example 7 may include the compiler of examples 1, and/or some other examples herein, wherein the data flow graph comprises information that indicates execution of the identified loop can commence if the backedge predicate of the identified loop, Pbackedge, is true.

Example 8 may include the compiler of example 1, and/or some other examples herein, wherein the source instructions of the computer program are written in a high level language selected from one of C, C++ or Fortran.

Example 9 may include the compiler of example 2, and/or some other examples herein, wherein the computation of the predicate for the identified loop is recursive, Pbackedge being a function of: Pinitial, predicates of code blocks comprising the loop, and branch conditions of those code blocks.

Example 10 may include the compiler of example 9, and/or some other examples herein, wherein the identified nested loops include inner loops and outer loops, and wherein the predicate for an inner loop is computed first.

Example 11 may include the compiler of example 10, and/or some other examples herein, wherein, for an identified inner loop with two code blocks, an initial code block Bm and a final code block Bn, and wherein the initial code block Bm has a predecessor code block Bl, and if:
Pm is a predicate for code block Bm, Pn is a predicate for code block Bn, Pmn is a predicate for a control edge BmBn denoting process flow moving from code block Bm to code block Bn, Pnm is a predicate for a backedge Pnm denoting process flow moving from code block Bn to code block Bm, Plm is a predicate for a control edge denoting process flow moving from code block Bl to code block Bm, and Cm is a branch condition for code block Bm, and Cn is a branch condition for code block Bn, then the predicate Pm for the identified inner loop is computed as:
Pm=Pnm||Plm, where || is a logical OR operation,
Pmn=Pm && Cm, where || is a logical AND operation,
Pn=Pmn, and
Pnm=Pn && Cn.

Example 12 may include the compiler of example 11, and/or some other examples herein, further comprising computing the loop iteration predicate Piter for the inner loop, which is the backedge predicate Pnm of the loop when Pnm is true.

Example 13 may include the compiler of example 11, and/or some other examples herein, wherein the predicate computation for the inner loop begins once Plm is true.

Example 14 may include the compiler of any one of examples 1-13, and/or some other examples herein, wherein the executable code that recursively computes comprises executable code that recursively computes from inner loops to outer loops.

Example 15 may include an apparatus for computing, comprising: one or more processors; and a compiler to be operated by the one or more processors to compile a computer program, wherein the compiler includes: one or more analyzers to parse and analyze source instructions of a computer program including identification of nested loops of the computer program. The apparatus may further include a code generator coupled to the one or more analyzers to generate and output executable code for the computer program that executes on a data flow machines based at least in part in results of the analysis, wherein the executable code includes executable code that computes predicates of identified nested loops to allow execution of each loop to start when the loop's predicate is available, independent of whether any other loop is in execution or not.

Example 16 may include the apparatus of example 15, and/or some other examples herein, wherein the computed predicate of an identified loop is a function of the loop's initial predicate (Pinitial) and its backedge predicate (Pbackedge).

Example 17 may include the apparatus of example 16, and/or some other examples herein, wherein the predicate of the identified loop is computed as: Pbackedge Pinitial, where || is a logical OR operation.

Example 18 may include the apparatus of example 17, and/or some other examples herein, wherein Pbackedge is first evaluated, and if Pbackedge is true, Pinitial is not evaluated.

Example 19 may include the apparatus of example 15, and/or some other examples herein, wherein the computed predicate of an identified loop is also a function of branch conditions within the loop.

Example 20 may include the apparatus of example 15, and/or some other examples herein, wherein the executable code further comprises an instruction to run the identified loop if the backedge predicate of the identified loop, Pbackedge, is true.

Example 21 may include the apparatus of example 15, and/or some other examples herein, wherein the computation of the predicate for the identified loop is recursive, Pbackedge being a function of: Pinitial, predicates of blocks comprising the loop, and branch conditions of those blocks.

Example 22 may include the apparatus of example 21, and/or some other examples herein, wherein the identified nested loops include inner loops and outer loops, and wherein the predicate for an inner loop is computed first.

Example 23 may include the apparatus of example 16, and/or some other examples herein, wherein Pinitial is only evaluated once for all of the iterations of the loop.

Example 24 may include the apparatus of example 15, and/or some other examples herein, wherein the source instructions of the computer program are written in a high level language selected from one of C, C++ or Fortran.

Example 25 may include the apparatus of example 24, and/or some other examples herein, wherein for an identified inner loop with two code blocks, an initial code block Bm and a final code block Bn, and wherein the initial code block Bm has a predecessor code block Bl, and if:
Pm is a predicate for code block Bm, Pn is a predicate for code block Bn, Pmn is a predicate for a control edge BmBn denoting process flow moving from code block Bm to code block Bn, Pnm is a predicate for a backedge Pnm denoting process flow moving from code block Bn to code block Bm, Plm is a predicate for a control edge denoting process flow moving from code block Bl to code block Bm, and Cm is a branch condition for code block Bm, and Cn is a branch condition for code block Bn, then the predicate Pm for the identified inner loop is computed as:
Pm=Pnm||Plm, where || is a logical OR operation,
Pmn=Pm && Cm, where || is a logical AND operation,
Pn=Pmn, and Pnm=Pn && Cn.

Example 26 may include the apparatus of example 25, and/or some other examples herein, further comprising computing the loop iteration predicate Piter for the inner loop, which is the backedge predicate Pnm of the loop when Pnm is true.

Example 27 may include the apparatus of example 25, and/or some other examples herein, wherein the predicate computation for the inner loop begins once Plm is true.

Example 28 may include the apparatus of any one of examples 15-27, and/or some other examples herein, wherein the executable code that recursively computes comprises executable code that recursively computes from inner loops to outer loops.

Example 29 may include the apparatus of example 28, and/or some other examples herein, wherein the data flow machine is a hardware accelerator with field programmable gate arrays.

Example 30 may include a method for compiling a computer program for execution on a dataflow machine for generating loop control signals, comprising: receiving source instructions of the computer program; parsing and analyzing the computer program including identifying nested loops of the computer program; and generating and outputting executable code for the computer program to execute on a data flow machine, including a data flow graph, based at least in part on results of the analyzing, wherein the executable code includes executable code that recursively computes predicates of identified nested loops to allow execution of each loop to start when the loop's predicate is available, independent of whether any other loop is in execution or not.

Example 31 may include the method of example 30, and/or some other examples herein, wherein the identified nested loops include inner loops and outer loops, and wherein the predicate for an inner loop is computed first.

Example 32 may include the method of example 30, and/or some other examples herein, wherein the computed predicate of an identified loop is a function of the loop's initial predicate (Pinitial), its backedge predicate (Pbackedge).

Example 33 may include the method of example 32, and/or some other examples herein, wherein the predicate of the identified loop is computed as: Pbackedge||Pinitial, where || is a short-circuit logical OR operation, wherein Pbackedge is first evaluated, and if Pbackedge is true, Pinitial is not evaluated.

Example 34 may include the method of example 32, and/or some other examples herein, where Pinitial is only evaluated once for all of the iterations of the loop.

Example 35 may include the method of example 32, and/or some other examples herein, Example 36 may include the method of example 30, and/or some other examples herein, wherein the computed predicate of an identified loop is also a function of branch conditions within the loop.

Example 37 may include the method of example 30, and/or some other examples herein, wherein the source instructions of the computer program are written in a high level language selected from one of C, C++ or Fortran.

Example 38 may include the method of any one of examples 30-37, and/or some other examples herein, wherein the executable code that recursively computes comprises executable code that recursively computes from inner loops to outer loops.

Example 39 may include the method of example 31, and/or some other examples herein, wherein for an identified inner loop with two code blocks, an initial code block Bm and a final code block Bn, and wherein the initial code block Bm has a predecessor code block Bl, and if: Pm is a predicate for code block Bm, Pn is a predicate for code block Bn, Pmn is a predicate for a control edge BmBn denoting process flow moving from code block Bm to code block Bn, Pnm is a predicate for a backedge Pnm denoting process flow moving from code block Bn to code block Bm, Plm is a predicate for a control edge denoting process flow moving from code block Bl to code block Bm, and Cm is a branch condition for code block Bm, and Cn is a branch condition for code block Bn, then the predicate Pm for the identified inner loop is computed as:

Pm=Pnm||Plm, where || is a logical OR operation,
Pmn=Pm && Cm, where || is a logical AND operation,
Pn=Pmn, and Pnm=Pn && Cn.

Example 40 may include the method of example 39, and/or some other examples herein, further comprising computing the loop iteration predicate Piter for the inner loop, which is the backedge predicate Pnm of the loop when Pnm is true.

Example 41 may include the method of example 39, and/or some other examples herein, wherein the predicate computation for the inner loop begins once Plm is true.

Example 42 may include the method of any one of examples 39-41, and/or some other examples herein, wherein the executable code that recursively computes comprises executable code that recursively computes from inner loops to outer loops.

Example 43 may include one or more non-transitory computer-readable storage media comprising a plurality of instructions that in response to being executed cause a computing device to: receive source instructions of a computer program; parse and analyze the computer program including identifying nested loops of the computer program; and generate and output executable code for the computer program to execute on a data flow machine, including a data flow graph, based at least in part on results of the analyzing, wherein the executable code includes executable code that recursively computes predicates of identified nested loops to allow execution of each loop to start when the loop's predicate is available, independent of whether any other loop is in execution or not.

Example 44 may include the one or more non-transitory computer-readable storage media of example 43, and/or some other examples herein, wherein the identified nested loops include inner loops and outer loops, and wherein the predicate for an inner loop is computed first.

Example 45 may include the one or more non-transitory computer-readable storage media of example 43, and/or some other examples herein, wherein the computed predicate of an identified loop is a function of the loop's initial predicate (Pinitial), its backedge predicate (Pbackedge).

Example 46 may include the one or more non-transitory computer-readable storage media of example 45, and/or some other examples herein, wherein the predicate of the identified loop is computed as: Pbackedge||Pinitial, where || is a short-circuit logical OR operation, wherein Pbackedge is first evaluated, and if Pbackedge is true, Pinitial is not evaluated.

Example 47 may include the one or more non-transitory computer-readable storage media of example 45, and/or some other examples herein, wherein Pinitial is only evaluated once for all of the iterations of the loop.

Example 48 may include the one or more non-transitory computer-readable storage media of example 45, and/or some other examples herein, wherein the computed predicate of an identified loop is also a function of branch conditions within the loop.

Example 49 may include the one or more non-transitory computer-readable storage media of example 45, and/or some other examples herein, wherein the data flow graph comprises information that indicates execution of the identified loop can commence if the backedge predicate of the identified loop, Pbackedge, is true.

Example 50 may include the one or more non-transitory computer-readable storage media of example 43, and/or some other examples herein, wherein the source instructions of the computer program are written in a high level language selected from one of C, C++ or Fortran.

Example 51 may include the one or more non-transitory computer-readable storage media of any one of examples 43-50, and/or some other examples herein, wherein the executable code that recursively computes comprises executable code that recursively computes from inner loops to outer loops.

Example 52 may include the one or more non-transitory computer-readable storage media of example 44, and/or some other examples herein, wherein for an identified inner loop with two code blocks, an initial code block Bm and a final code block Bn, and wherein the initial code block Bm has a predecessor code block Bl, and if: Pm is a predicate for code block Bm, Pn is a predicate for code block Bn, Pmn is a predicate for a control edge BmBn denoting process flow moving from code block Bm to code block Bn, Pnm is a predicate for a backedge Pnm denoting process flow moving from code block Bn to code block Bm, Plm is a predicate for a control edge denoting process flow moving from code block Bl to code block Bm, and Cm is a branch condition for code block Bm, and Cn is a branch condition for code block Bn, then the predicate Pm for the identified inner loop is computed as:

Pm=Pnm||Plm, where || is a logical OR operation,
Pmn=Pm && Cm, where || is a logical AND operation,
Pn=Pmn, and Pnm=Pn && Cn.

Example 53 may include the one or more non-transitory computer-readable storage media of example 53, and/or some other examples herein, wherein the plurality of instructions, in response to being executed further cause the computing device to compute the loop iteration predicate Piter for the inner loop, which is the backedge predicate Pnm of the loop when Pnm is true.

Example 54 may include the one or more non-transitory computer-readable storage media of example 52, and/or some other examples herein, wherein the predicate computation for the inner loop begins once Plm is true.

Example 55 may include the one or more non-transitory computer-readable storage media of claim 43, and/or some other examples herein, wherein the executable code that recursively computes comprises executable code that recursively computes from inner loops to outer loops.

Example 56 may include an apparatus for computing, comprising: means for receiving source instructions of a computer program; means for parsing and analyzing the computer program including identifying nested loops of the computer program; and means for generating and outputting executable code for the computer program to execute on a data flow machine, including a data flow graph, based at least in part on results of the analyzing, wherein the executable code includes executable code that recursively computes predicates of identified nested loops to allow execution of each loop to start when the loop's predicate is available, independent of whether any other loop is in execution or not.

Example 57 may include the apparatus for computing of example 56, and/or some other examples herein, wherein the identified nested loops include inner loops and outer loops, and wherein the predicate for an inner loop is computed first.

Example 58 may include the apparatus for computing of example 56, and/or some other examples herein, wherein the computed predicate of an identified loop is a function of the loop's initial predicate (Pinitial), its backedge predicate (Pbackedge).

Example 59 may include the apparatus for computing of example 58, and/or some other examples herein, wherein the predicate of the identified loop is computed as: Pbackedge Pinitial, where ‖ is a short-circuit logical OR operation, wherein Pbackedge is first evaluated, and if Pbackedge is true, Pinitial is not evaluated.

Example 60 may include the apparatus for computing of example 58, and/or some other examples herein, wherein Pinitial is only evaluated once for all of the iterations of the loop.

Example 61 may include the apparatus for computing of example 58, and/or some other examples herein, wherein the computed predicate of an identified loop is also a function of branch conditions within the loop.

Example 62 may include the apparatus for computing of example 56, and/or some other examples herein, wherein the data flow graph comprises information that indicates execution of the identified loop can commence if the backedge predicate of the identified loop, Pbackedge, is true.

Example 63 may include the apparatus for computing of example 56, and/or some other examples herein, wherein the source instructions of the computer program are written in a high level language selected from one of C, C++ or Fortran.

Example 64 may include the apparatus for computing of any one of examples 57, 58 or 61, and/or some other examples herein, wherein the computation of the predicates is recursive.

Example 65 may include the apparatus for computing of example 56, and/or some other examples herein, wherein for an identified inner loop with two code blocks, an initial code block Bm and a final code block Bn, and wherein the initial code block Bm has a predecessor code block Bl, and if: Pm is a predicate for code block Bm, Pn is a predicate for code block Bn, Pmn is a predicate for a control edge BmBn denoting process flow moving from code block Bm to code block Bn, Pnm is a predicate for a backedge Pnm denoting process flow moving from code block Bn to code block Bm, Plm is a predicate for a control edge denoting process flow moving from code block Bl to code block Bm, and Cm is a branch condition for code block Bm, and Cn is a branch condition for code block Bn, then the predicate Pm for the identified inner loop is computed as:
Pm=Pnm‖Plm, where ‖ is a logical OR operation,
Pmn=Pm && Cm, where ‖ is a logical AND operation,
Pn=Pmn, and Pnm=Pn && Cn.

Example 66 may include the apparatus for computing of example 65, and/or some other examples herein, further comprising means for computing the loop iteration predicate Piter for the inner loop, which is the backedge predicate Pnm of the loop when Pnm is true.

Example 67 may include the apparatus for computing of example 65, and/or some other examples herein, wherein the predicate computation for the inner loop begins once Plm is true.

Example 68 may include the apparatus for computing of any one of examples 56-67, and/or some other examples herein, wherein the executable code that recursively computes comprises executable code that recursively computes from inner loops to outer loops.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

What is claimed is:

1. A method for compiling a computer program for execution on a data flow machine for generating loop control signals, comprising:
receiving source instructions of the computer program;
parsing and analyzing the computer program including identifying nested loops of the computer program; and
generating and outputting executable code for the computer program to execute on a data flow machine based at least in part on results of the analyzing, wherein the executable code includes executable code that recursively computes predicates of identified nested loops to allow execution of each loop to start when the loop's predicate is available, independent of whether any other loop is in execution or not,
wherein the computed predicate of an identified loop is a function of the loop's initial predicate (Pinitial), its backedge predicate (Pbackedge), and branch conditions at its initial and final blocks.

2. The method of claim 1, wherein the identified nested loops include inner loops and outer loops, and wherein the predicate for an inner loop is computed first.

3. The method of claim 1, wherein the predicate of the identified loop is computed as: Pbackedge‖Pinitial, where ‖ is a short-circuit logical operator, wherein Pbackedge is first evaluated, and if Pbackedge is true, Pinitial is not evaluated.

4. The method of claim 1, wherein the computation of the predicate for the identified loop is recursive.

5. The method of claim 1, wherein the identified nested loops include inner loops and outer loops, and wherein the predicate for an inner loop is computed first.

6. A compiler for compiling a computer program, comprising:
one or more analyzers residing in a memory, to, when executed by at least one processor coupled to the memory, parse and analyze source instructions of a computer program including identification of nested loops of the computer program; and
a code generator, residing in the memory and coupled to the one or more analyzers, to, when executed by the at least one processor, generate and output executable code for the computer program that executes on a data flow machine, including a data flow graph, based at least in part on results of the analysis, wherein the executable code includes executable code that recursively computes predicates of identified nested loops for use to generate a control signal for the data flow graph to allow execution of each loop to start when the loop's predicate is available, independent of whether any other loop is in execution or not,
wherein the data flow graph includes information that indicates execution of the identified loop can commence if a backedge predicate of the identified loop (Pbackedge) is true.

7. The compiler of claim 6, wherein the computed predicate of an identified loop is a function of the loop's initial predicate (Pinitial) and its Pbackedge.

8. The compiler of claim 7, wherein the predicate of the identified loop is computed as: Pbackedge||Pinitial, where || is a logical OR operation.

9. The compiler of claim 8, wherein the predicate of the identified loop is computed as: Pbackedge||Pinitial, where || operator is a short-circuit operator, wherein Pbackedge is first evaluated, and if Pbackedge is true, Pinitial is not evaluated.

10. The compiler of claim 7, where Pinitial is only evaluated once for all iterations of the loop.

11. The compiler of claim 7, wherein the computed predicate of an identified loop is also a function of branch conditions within the loop.

12. The compiler of claim 7, wherein the computation of the predicate for the identified loop is recursive, Pbackedge being a function of: Pinitial, predicates of code blocks comprising the loop, and branch conditions of those code blocks.

13. The compiler of claim 12, wherein the identified nested loops include inner loops and outer loops, and wherein the predicate for an inner loop is computed first.

14. The compiler of claim 13, wherein, for an identified inner loop with two code blocks, an initial code block Bm and a final code block Bn, and wherein the initial code block Bm has a predecessor code block Bl, and if:
Pm is a predicate for code block Bm, Pn is a predicate for code block Bn,
Pmn is a predicate for a control edge BmBn denoting process flow moving from code block Bm to code block Bn,
Pnm is a predicate for a backedge Pnm denoting process flow moving from code block Bn to code block Bm,
Plm is a predicate for a control edge denoting process flow moving from code block Bl to code block Bm, and
Cm is a branch condition for code block Bm, and Cn is a branch condition for code block Bn,
then the predicate Pm for the identified inner loop is computed as:
Pm=Pnm||Plm, where || is a logical OR operation,
Pmn=Pm && Cm, where && is a logical AND operation,
Pn=Pmn, and
Pnm=Pn && Cn.

15. The compiler of claim 14, further comprising computing a loop iteration predicate Piter for the inner loop, which is the backedge predicate Pnm of the loop when Pnm is true.

16. The compiler of claim 14, wherein a predicate computation for the inner loop begins once Plm is true.

17. The compiler of claim 6, wherein the source instructions of the computer program are written in a high level language selected from one of C, C++ or Fortran.

18. The compiler of claim 6, wherein the executable code that recursively computes comprises executable code that recursively computes from inner loops to outer loops.

19. An apparatus for computing, comprising:
one or more processors; and
a compiler stored in a memory to be operated by the one or more processors to compile a computer program, wherein the compiler includes:
one or more analyzers to parse and analyze source instructions of a computer program including identification of nested loops of the computer program; and
a code generator coupled to the one or more analyzers to generate and output executable code for the computer program that executes on a data flow machine based at least in part on results of the analysis, wherein the executable code includes executable code that computes predicates of identified nested loops to allow execution of each loop to start when the loop's predicate is available, independent of whether any other loop is in execution or not,
wherein the executable code further includes an instruction to run the identified loop if a backedge predicate of the identified loop (Pbackedge) is true.

20. The apparatus of claim 19, wherein the computed predicate of an identified loop is a function of the loop's initial predicate (Pinitial) and its backedge predicate (Pbackedge).

21. The apparatus of claim 20, wherein the predicate of the identified loop is computed as: Pbackedge||Pinitial, where || is a short-circuit logical operator, wherein Pbackedge is first evaluated, and if Pbackedge is true, Pinitial is not evaluated.

22. The apparatus of claim 19, wherein the computed predicate of an identified loop is also a function of branch conditions within the loop.

23. The apparatus of claim 19, wherein the computation of the predicate for the identified loop is recursive, Pbackedge being a function of: Pinitial, predicates of blocks comprising the loop, and branch conditions of those blocks.

24. The apparatus of claim 19, wherein the identified nested loops include inner loops and outer loops, and wherein the predicate for an inner loop is computed first.

* * * * *